United States Patent [19]

Taylor, Jr.

[11] Patent Number: 5,138,323
[45] Date of Patent: Aug. 11, 1992

[54] METHOD AND APPARATUS FOR PROVIDING OPTIMUM RADAR ELEVATION PATTERNS AT LONG AND SHORT RANGES

[75] Inventor: John W. Taylor, Jr., Baltimore, Md.

[73] Assignee: Westinghouse Electric Corp., Pittsburgh, Pa.

[21] Appl. No.: 669,558

[22] Filed: Mar. 14, 1991

[51] Int. Cl.⁵ ............................................. G01S 13/08
[52] U.S. Cl. ................................................. 342/134
[58] Field of Search .......................... 342/134, 137, 158

[56] References Cited

U.S. PATENT DOCUMENTS

4,303,920 12/1981 Mortimer ............................. 342/137
4,573,050 2/1986 Waters ................................. 342/137
4,951,059 8/1990 Taylor, Jr. .

Primary Examiner—Mark Hellner
Attorney, Agent, or Firm—T. H. Martin

[57] ABSTRACT

A method and apparatus are disclosed for providing optimum radar beam patterns to provide complete radar coverage at both short ranges and long ranges in a radar system using solid state transmitters. Long pulses for covering long ranges are generated and split into a pair of signals with a specific amplitude and phase relationship. These signals are provided to a transmit beam forming matrix of an array antenna to generate an optimum pattern for long range coverage. Short pulses are generated for providing short range coverage and are split into a pair of signals which are phase shifted differently from the long pulses. These signals are then provided to the transmit beam forming matrix to generate a different beam pattern for providing short range detection. The short range beam pattern has a sufficient amount of energy to provide coverage to maximum desired altitude over a range extending to where echoes from the long pulses may be received undistorted.

14 Claims, 6 Drawing Sheets

FIG. 4A — SIGNAL ON LINE 56, $f_1$

FIG. 4B — SIGNAL ON LINE 58, $f_1$

FIG. 4C — SIGNAL ON LINE 56, $f_2$

FIG. 4D — SIGNAL ON LINE 58, $f_2$

METHOD AND APPARATUS FOR PROVIDING OPTIMUM RADAR ELEVATION PATTERNS AT LONG AND SHORT RANGES

CROSS REFERENCE TO RELATED APPLICATION

This application is related to U.S. patent application Ser. No. 267,088, filed Nov. 3, 1988 now abandoned and assigned to the same assignee as the present application.

BACKGROUND OF THE INVENTION

The invention relates to a method and apparatus for providing optimum radar elevation patterns at long and short ranges, and more specifically, to a method and apparatus for transmitting high energy pulses, also referred to as long pulses, in a first optimum beam pattern for detection of targets at long ranges, and transmitting low energy pulses, also referred to as short pulses, in a second optimum beam pattern for detection of targets at short ranges, in surveillance radar using solid-state transmitters.

Solid state transmitters are gradually replacing magnetron and klystron transmitters. Although providing numerous advantages over magnetron and klystron transmitters, solid state transmitters have one drawback in that they generate low peak power. Consequently, sufficient energy for long range detection can be provided only by transmitting long pulses. However, the longer the pulse, the farther away the object must be to ensure that its echo is not distorted by a transmitted pulse unavoidably present in the receiver. For example, if a pulse of 100 μs is transmitted, the target must be at least 8 nautical miles (nmi) away from the transmitter before its entire echo can be received undistorted. Exceedingly strong short range clutter echoes complicate reception such that only echoes beginning several nautical miles beyond the end of the transmission can be received without distortion.

Long pulses for solid-state radars can be coded to provide the bandwidth necessary for the desired range accuracy and resolution. Echoes received are decoded or "compressed" into short pulses, but some undesired energy known as "range sidelobes" extend as much as the transmitter pulsewidth to either side of the desired short pulse, obscuring weaker echoes from neighboring targets. If the uncompressed echo is distorted by strong overlapping interference (transmitted pulse or short range clutter echoes) exceeding the linear dynamic range of the receiver, the range sidelobes grow larger, making it impossible to detect the presence of a small aircraft at the same azimuth as a large aircraft, unless their range separation exceeds the transmitter pulsewidth. This is unacceptable for airport surveillance radar (ASR), where collision avoidance between large commercial airliners and small general aviation aircraft is of prime concern.

Thus, since long pulses cannot be utilized to accurately detect targets at short ranges, it is necessary to transmit separate long and short pulses to provide long range and short range coverage, respectively. Examples of ASR systems utilizing this technique are the RAMP PSR manufactured by the Raytheon Corp. and the AN/TPS-73 manufactured by the Selenia/Unisys Corps.

Figure 1:
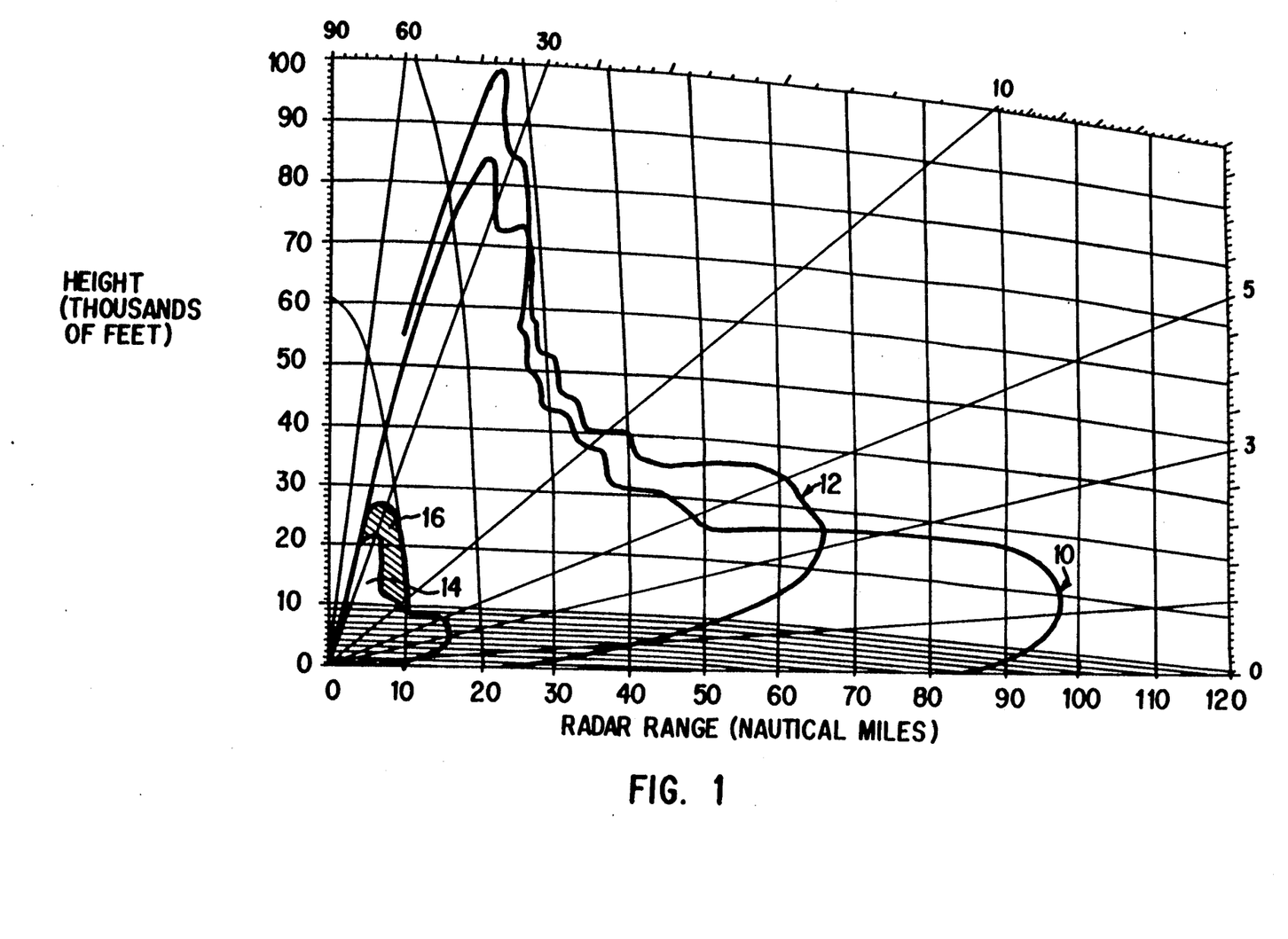
FIG. 1 is a graph of long and short range coverage patterns of a known ASR system.

FIG. 1 is a graph showing exemplary coverage patterns for the RAMP PSR. The coverage patterns show target locations where the circularly polarized radar provides 80% probability of detection of a two square meter target. Coverage patterns 10 and 14 result from transmission and reception on the same beam. Coverage pattern 12 results from reception on a higher elevation beam and cannot be employed past 20 nmi without losing coverage of low altitude aircraft.

The long range pulses, corresponding to beam patterns 10 and 12, are 100 μs in length, and the short range pulses, corresponding to coverage pattern 14 are 1 μs in length. The long range coverage pattern presumes no ground clutter interference. At short range, echoes from terrain or sea create clutter interference which must be suppressed by the use of filters which reject their low Doppler frequencies, sometimes called moving target indicators (MTI). As is well known in the radar art, Doppler filters introduce losses in sensitivity, even when they are able to attenuate clutter echoes well below receiver noise.

A first loss, estimated to be 4 dB in computing coverage pattern 14, is caused by the correlation of receiver noise by the Doppler filter, reducing the effectiveness of integrating the multiple samples received during the time that the antenna beam dwells on a target. The reduction of the effective number of pulses integrated causes an increase in the average echo power required to achieve a given detection probability. This sensitivity loss is exaggerated by signal processing to control the false alarm rate in rain or jamming environments.

A second loss is created when the target has an unfavorable Doppler frequency, even though outside the clutter rejection notch. The gain of the Doppler filter varies as a function of the target range rate. This is known as velocity response. "Blind speeds" are those speeds with response more than 20 dB below average, and "dim speeds" create more modest loss. Operational utility of a radar depends on detecting targets at a large fraction (90-99%) of possible range rates, therefore, velocity response loss shrinks coverage 14.

The peak power of the signal used for both the long and short pulses is the same. However, the short pulse contains approximately 20 dB less energy. The short pulse sensitivity, including 4 dB average Doppler filtering loss, is 24 dB less than the long pulse, shrinking the coverage of the short range beam pattern in both range and altitude by a factor of 4. As a result, as is apparent in FIG. 1, an area 16 exists in the coverage pattern above approximately 10,000 feet for distances within approximately 10 nmi of the radar transmitter where neither the long range nor short range beam patterns provide aircraft detection. This area 16 is referred to herein as a "hole" in the coverage pattern. Any "hole" in the coverage pattern of a radar system is, of course, a serious problem.

As described, the coverage pattern 14 in FIG. 1 and to a two square meter aircraft with a range rate resulting in 0 dB signal-to-noise gain from the Doppler filter. A smaller aircraft or a range rate corresponding to a "dim speed" would create a much larger "hole" in the critical coverage region of an ASR system.

The beam coverage pattern 10 shown in FIG. 1 also exaggerates clutter interference, providing about 22 dB higher gain to hills in the nose of the beam patterns than to aircraft at elevation angles between 15° and 35°. Receiving the long range pulse over a higher elevation pattern, such as beam pattern 12, is helpful in reducing this clutter exaggeration in the 10 to 30 nmi range, but it is substantially ineffective in the short range region. In particular, at approximately the 5 nmi range, a hill has to be only 1,500 feet above the airport (approximately 3° of elevation) to create stronger clutter echoes in the high beam 12 than in the low beam 10.

The only known prior solution to correct for inadequate range coverage is to increase the peak power of the transmitted pulses by about 40%. This permits the long pulse length to be shortened to approximately 70 $\mu$s which moves the long range beam coverage closer to the transmitter to about 7.5 nmi, and provides sufficient energy to the short pulse to cover out to about 7.5 nmi for a specified aircraft cross-section at average Doppler. However, increasing the peak power of the transmitted pulses significantly increases the cost of the transmitter. Also, provision of an adequate safety factor of power to cope with "dim speeds" or smaller aircraft cross-sections becomes very costly and causes even more saturation of clutter echoes.

SUMMARY OF THE INVENTION

Accordingly, it is an object of the present invention to provide a method and apparatus for providing a less costly solid-state transmitter capable of providing complete long and short range beam pattern coverage for a radar system such as an ASR.

It is another object of the present invention to provide a method and apparatus for transmitting and receiving high energy pulses over a first beam pattern for accurately detecting targets at long ranges and for transmitting and receiving low energy pulses over a second beam pattern for accurately detecting targets at short ranges.

Additional objects and advantages of the invention will be set forth in the description which follows, and in part will be apparent from the description, or may be learned by practice of the invention. The objects and advantages of the invention may be realized and obtained by means of the methods, instrumentalities and combinations particularly pointed out in the appended claims.

To achieve the foregoing objects, and in accordance with the purposes of the invention as embodied and broadly described herein, a radar apparatus is provided for providing radar coverage, comprising: a waveform generator for generating high-energy pulses and low-energy pulses; a waveform splitter connected to the waveform generator for splitting each of the high-energy pulses and low-energy pulses into first and second signals; a differential phase shifter connected to the waveform splitter for receiving the first and second signals; a beam forming matrix connected to the differential phase shifter; an array antenna connected to the beam forming matrix; and a controller connected to the differential phase shifter and providing a first control signal to the differential phase shifter to shift one of the first and second signals input to the differential phase shifter relative to the other of the first and second signals input to the differential phase shifter when the waveform generator generates the low-energy pulses.

Also in accordance with the invention, a pair of amplifiers is provided between the differential phase shifter and the beam-forming matrix to increase the peak power and energy content of the radiated pulses.

BRIEF DESCRIPTION OF THE DRAWINGS

The accompanying drawings, which are incorporated in and constitute a part of the specification, illustrate a presently preferred embodiment and method of the invention which, taken with the general description given above and the detailed description of the preferred embodiment and method given below, serve to explain the principles of the invention. Of the drawings.

DETAILED DESCRIPTION OF THE PREFERRED EMBODIMENT

Figure 2:
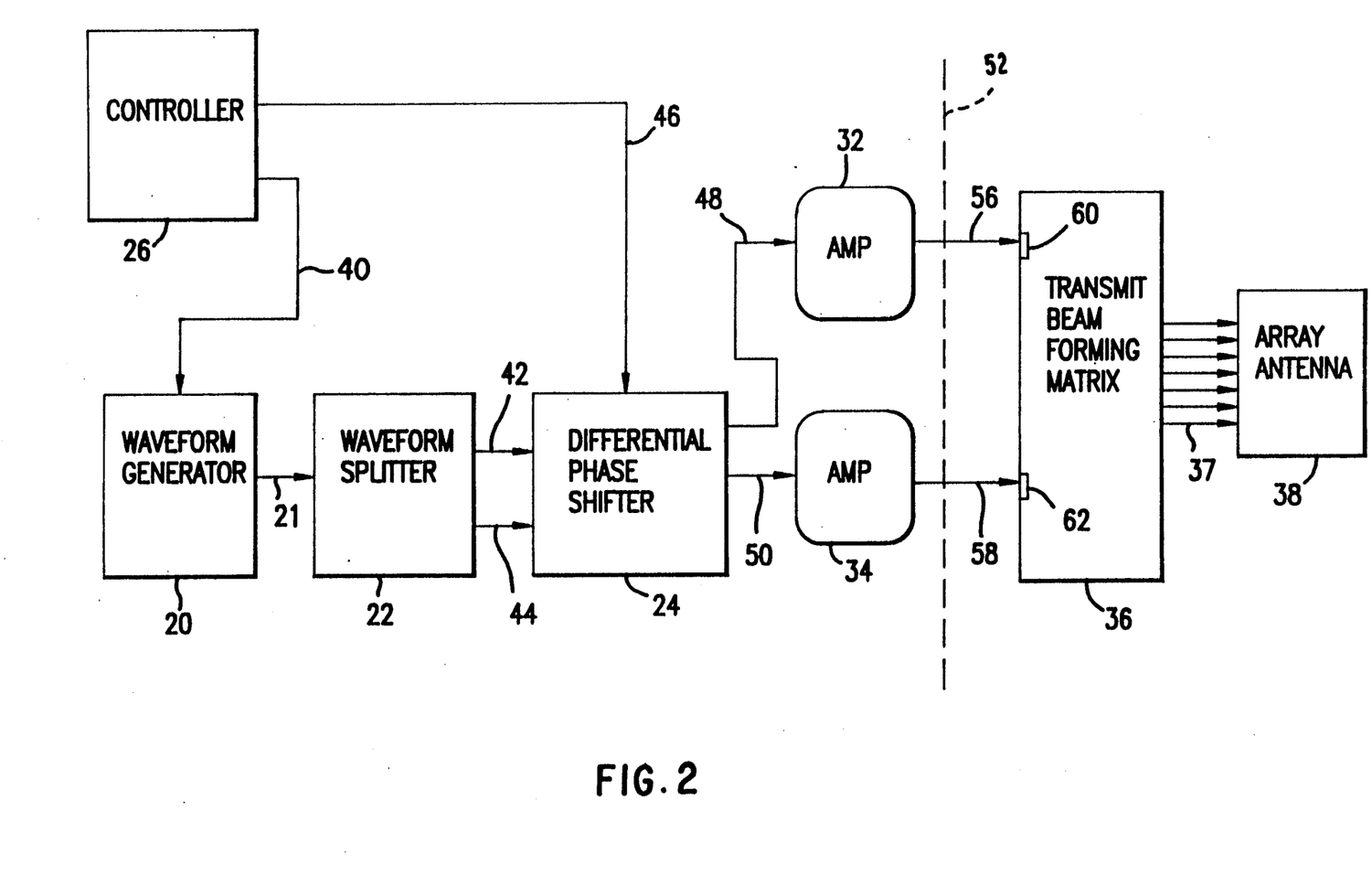
FIG. 2 is a block diagram of an ASR system in accordance with the present invention.

FIG. 2 is a block diagram of a preferred embodiment of an ASR system for providing complete radar coverage and preventing the occurrence of "holes" in long and short range coverage patterns. The system includes waveform generator 20, waveform splitter 22, differential phase shifter 24, controller 26, amplifiers 32 and 34, transmit beam-forming matrix 36 and array antenna 38 which may radiate either directly to a target or indirectly via a reflector or lens (not shown). Dashed line 52 indicates the preferred location of a rotary joint (not shown).

Controller 26 is connected to waveform generator 20 via line 40 and differential phase shifter 24 via line 46. Waveform generator 20 is coupled via line 21 to waveform splitter 22, which provides two inputs 42 and 44 to differential phase shifter 24. Amplifiers 32 and 34 are connected to differential phase shifter 24 via lines 48 and 50, respectively, and to transmit beam-forming matrix 36 via lines 56 and 58, respectively. Transmit beam forming matrix 36 is connected to each horizontal row of array antenna 38 via a plurality of connection lines 37.

Figure 3A:
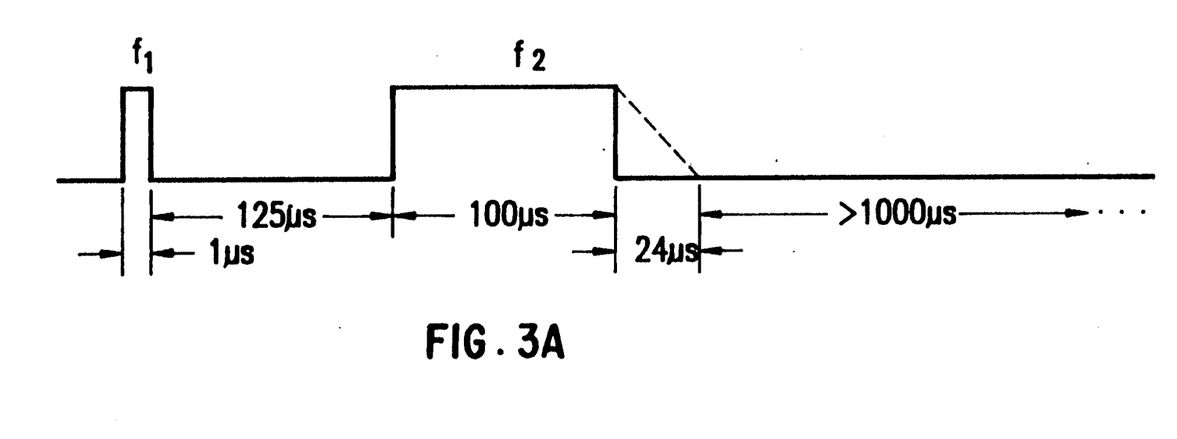
FIG. 3A is a timing diagram for generating long (high-energy) and short (low-energy) pulses in an ASR having a single receiver.
Figure 3B:
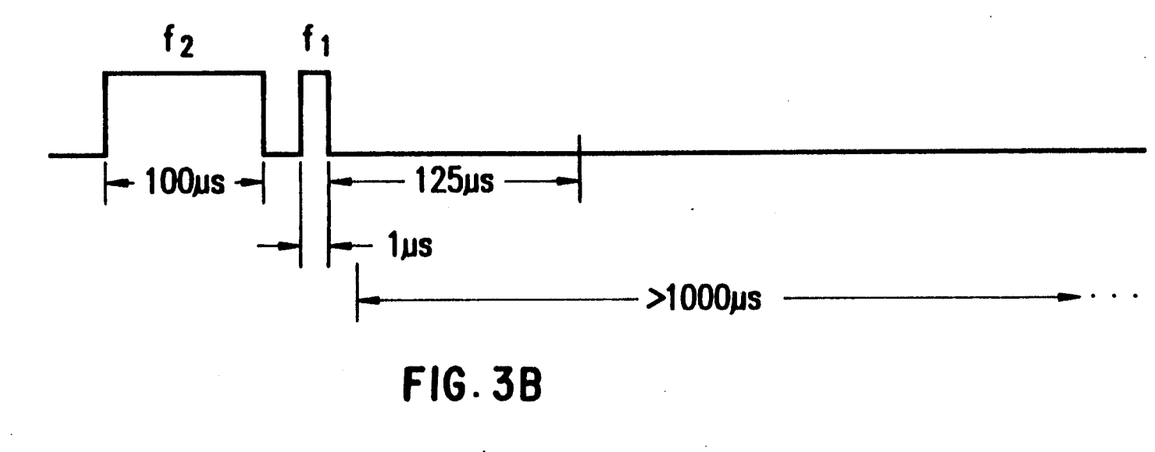
FIG. 3B is a timing diagram for generating long (high-energy) and short (low-energy) pulses in an ASR having a pair of receivers.

FIGS. 3A and 3B illustrate examples of long and short pulses used to provide the desired coverage patterns according to one embodiment of the present invention. FIG. 3A corresponds to an ASR having a single receiver for receiving both beams sequentially. The 1 $\mu$s pulse is emitted by array antenna 38. This is followed by a period of 125 $\mu$s in which to detect the echo of the 1 $\mu$s pulse from a target less than 10 nmi from the radar. After this 125 $\mu$s period, the 100 $\mu$s pulse is emitted by array antenna 38. More than 1,000 $\mu$s are then provided to allow for detection of the echo of the long pulse from a target between 10 nmi and a maximum instrumented range. Further, a delay of 24 $\mu$s is provided between the trailing edge of the transmitted pulse and the leading edge of an echo from the 10 nmi range because clutter echoes may saturate the receiver during that time period. Using sequential reception, the frequencies of the long and short pulses $f_2$ and $f_1$, respectively, are preferably different. However, these frequencies could be the same if the extent of mutual interference is considered acceptable.

FIG. 3B illustrates examples of long and short pulses used to provide the desired coverage patterns in an ASR having a pair of receivers for simultaneous beam reception. A 100 µs pulse is transmitted by array antenna 38 followed closely by the short pulse of 1 µs. For simultaneous reception, long and short pulses have different frequencies $f_2$ and $f_1$. From 0 to 125 µs after transmission of the short pulse, detection of the echoes from this pulse are provided by a first receiver. From 24 µs to more than 1,000 µs after transmission of the long pulse reception of an echo from the long pulse is provided by a second receiver.

Operation of the ASR system shown in FIG. 2 is as follows. In response to signals on line 40 from controller 26, waveform generator 20 generates short and long transmission pulses at appropriate intervals. These pulses are output to waveform splitter 22, where they are split into equal or unequal signals and output on lines 42 and 44 to differential phase shifter 24. During an interval in which waveform generator 20 generates a short pulse, controller 26 also outputs a first control signal on line 46 to differential phase shifter 24 to create a first phase relationship between signals output by differential phase shifter 24 on lines 48 and 50.

Because the gains of amplifiers 32 and 34 may not be equal and their phase transfer functions may not match over wide bandwidths, the relative amplitude and phase conditions on lines 48 and 50 may differ from the conditions desired on lines 56 and 58. Thus, the first phase relationship between the signals on lines 48 and 50 may be frequency dependent to overcome any unbalance in phase characteristics of amplifiers 32 and 34.

The signals output by amplifiers 32 and 34 on lines 56 and 58, respectively have a fixed phase relationship. For example, the signal on line 58 may be shifted 180° from the signal on line 56. During an interval in which waveform generator 20 generates a long pulse, controller 26 outputs a second control signal on line 46 to create a second phase relationship between the signals output by differential phase shifter 24 on lines 48 and 50. Again, amplifiers 32 and 34 provide a fixed phase relationship between these signals output on lines 56 and 58. For example, the signals on lines 56 and 58 may have 0° phase shift.

Figure 4A:
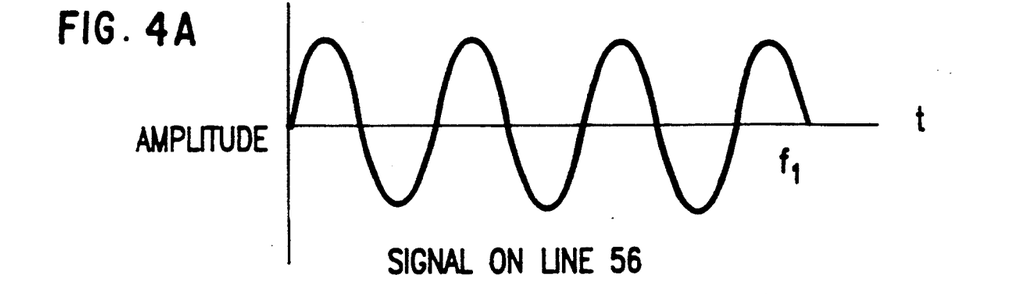
FIGS. 4A–4D illustrate the phase relationship between output signals of a differential phase shifter in response to first and second control signals.
Figure 4B:
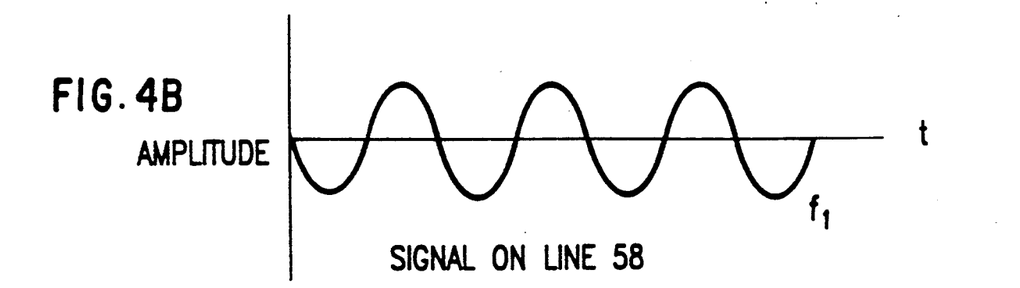
Figure 4C:
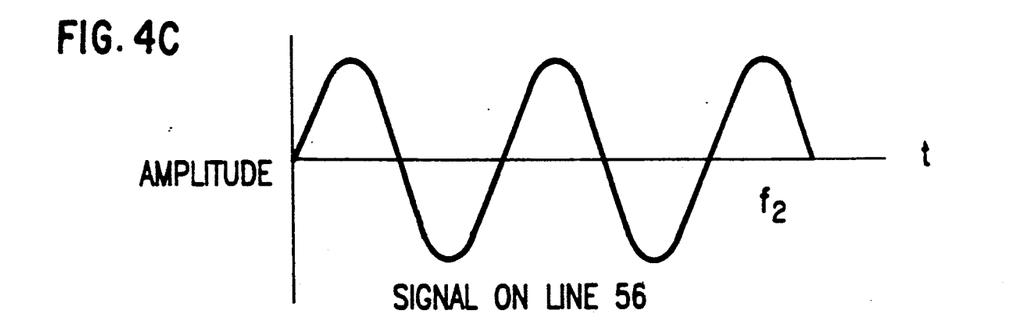
Figure 4D:
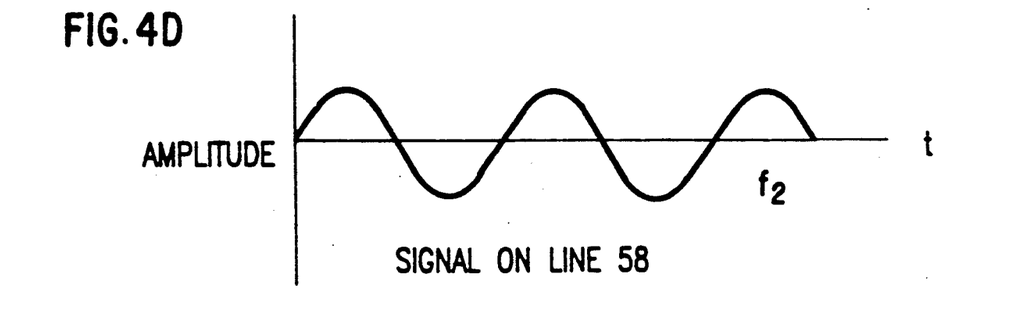

FIGS. 4A and 4D illustrate these first and second phase relationships. FIGS. 4A and 4B illustrate the carrier waveform on lines 56 and 58, having frequency $f_1$. As shown, the amplitude of the signal on line 56 (FIG. 4A) is greater than that on line 58 (FIG. 4B), however, the amplitudes may be the same. Moreover, the signal on line 58 (FIG. 4B) is shifted in phase 180° from the signal on line 56 (FIG. 4A).

FIGS. 4C and 4D illustrate the carrier waveform of the long pulse on lines 56 and 58, having frequency $f_2$. The amplitude of the signal on line 56 (FIG. 4C) is shown greater than the amplitude of the signal on line 58 (FIG. 4D), however, these amplitudes may be the same. Moreover, these signals are in phase, i.e. shifted in phase by 0°. Thus, the first and second control signals output on line 46 by controller 26 to differential phase shifter 24 provide frequency dependent first and second phase relationships between the output signals on lines 48 and 50, respectively, and amplifiers 32 and 34 provide fixed first and second phase relationships between the signals output on lines 56 and 58, respectively.

The signals output by amplifiers 32 and 34, respectively, are input to inputs 60 and 62, respectively, of transmit beam forming matrix 36.

Although splitting the power equally is preferred, the power of the signal to be transmitted by antenna 38 may be split unequally between the signal at input 60 and signal at input 62 in the transmit beam forming matrix. For example, two thirds of the power may be in the signal at input 60 and one third in the signal at input 62 or vice versa. The desired coverage patterns are the vector sums of the patterns generated by inputs 60 and 62 individually, with two different differential phase conditions, for example, 0° and 180° phase shift.

Transmit beam forming matrix 36 may comprise the "Transmit Sum And Diff Beamswitch Network 58," "Low TX Beamformer 62" and "High TX Beamformer 68" described in co-pending U.S. patent application Ser. No. 267,088, filed Nov. 3, 1988. However, unlike in copending U.S. patent application No. 267,088 where separate rows of the array feed are used to generate a low beam and only a few of the rows are employed in both transmissions, in a preferred embodiment of the present invention, substantially all of the rows of antenna 38 are shared in generating the transmitted beams at low and medium elevation angles.

Figure 5:
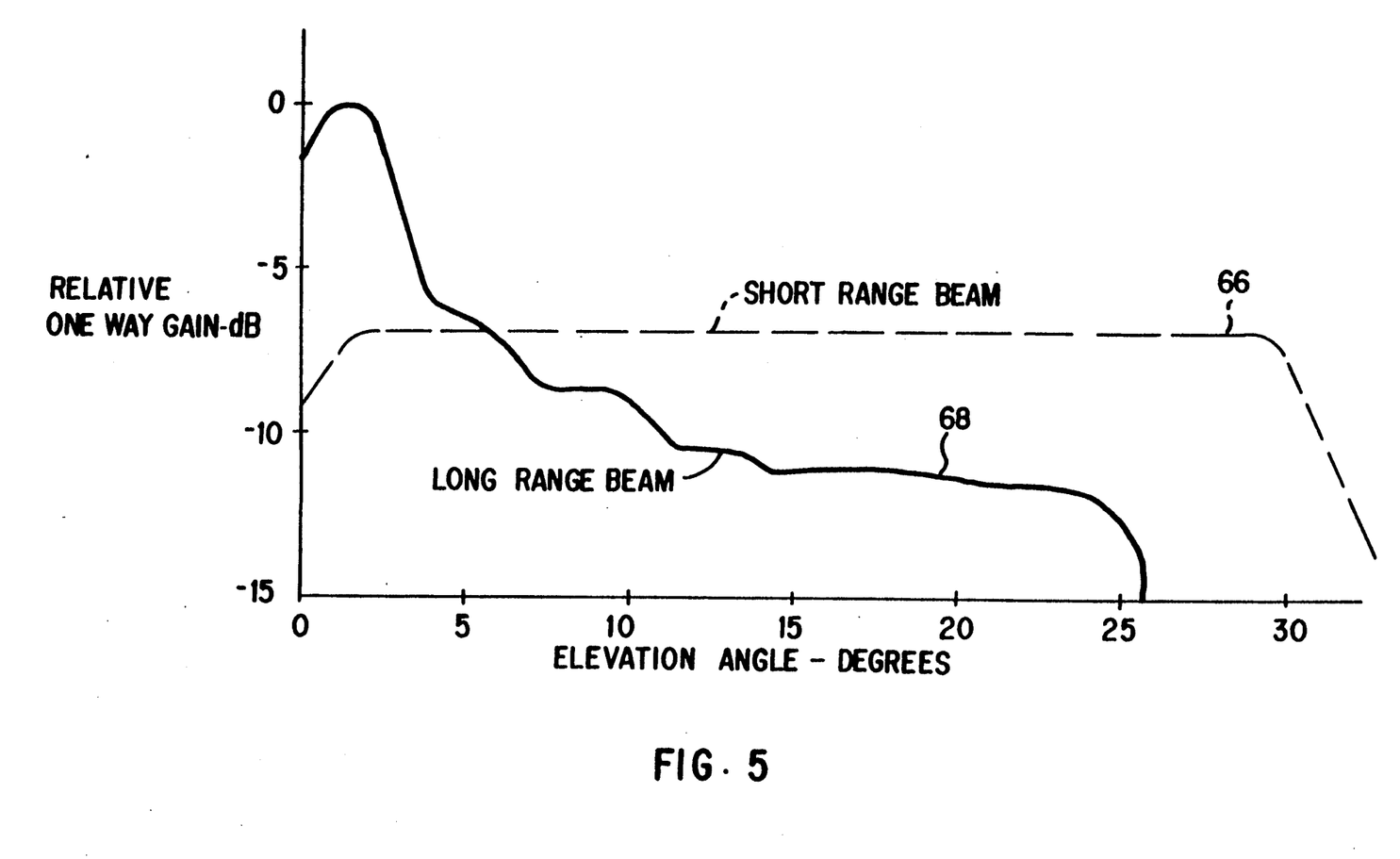
FIG. 5 is a graph of long and short range elevation beam patterns in accordance with the present invention which eliminate the coverage "hole" of FIG. 1.

The resulting short range beam pattern formed by the transmit beam forming matrix 36 and output by antenna 38 is shown as reference numeral 66 in FIG. 5. The resultant long range beam pattern formed by the transmit beam forming matrix 36 and output by antenna 38 is shown as reference numeral 68 in FIG. 5.

The "optimum" beam pattern elevation for short range coverage is one having essentially constant two way gain (the product of the gain on transmission and reception) at all elevation angles of interest (1°-30° for ASRs). This provides equal gain to a target at all altitudes and avoids exaggerating clutter interference. If the same beam pattern is used for transmission and reception, the short range beam pattern 66 shown in FIG. 5 corresponds to this optimum beam pattern. Because the area under beam pattern 66 must equal that under beam pattern 68 in FIG. 5, when both are plotted in power units rather than dB, peak gain of pattern 66 is about 7 dB less than pattern 68. If the same pattern is used for reception, the echo is 14 dB below that of pattern 68 at optimum elevation.

Figure 6:
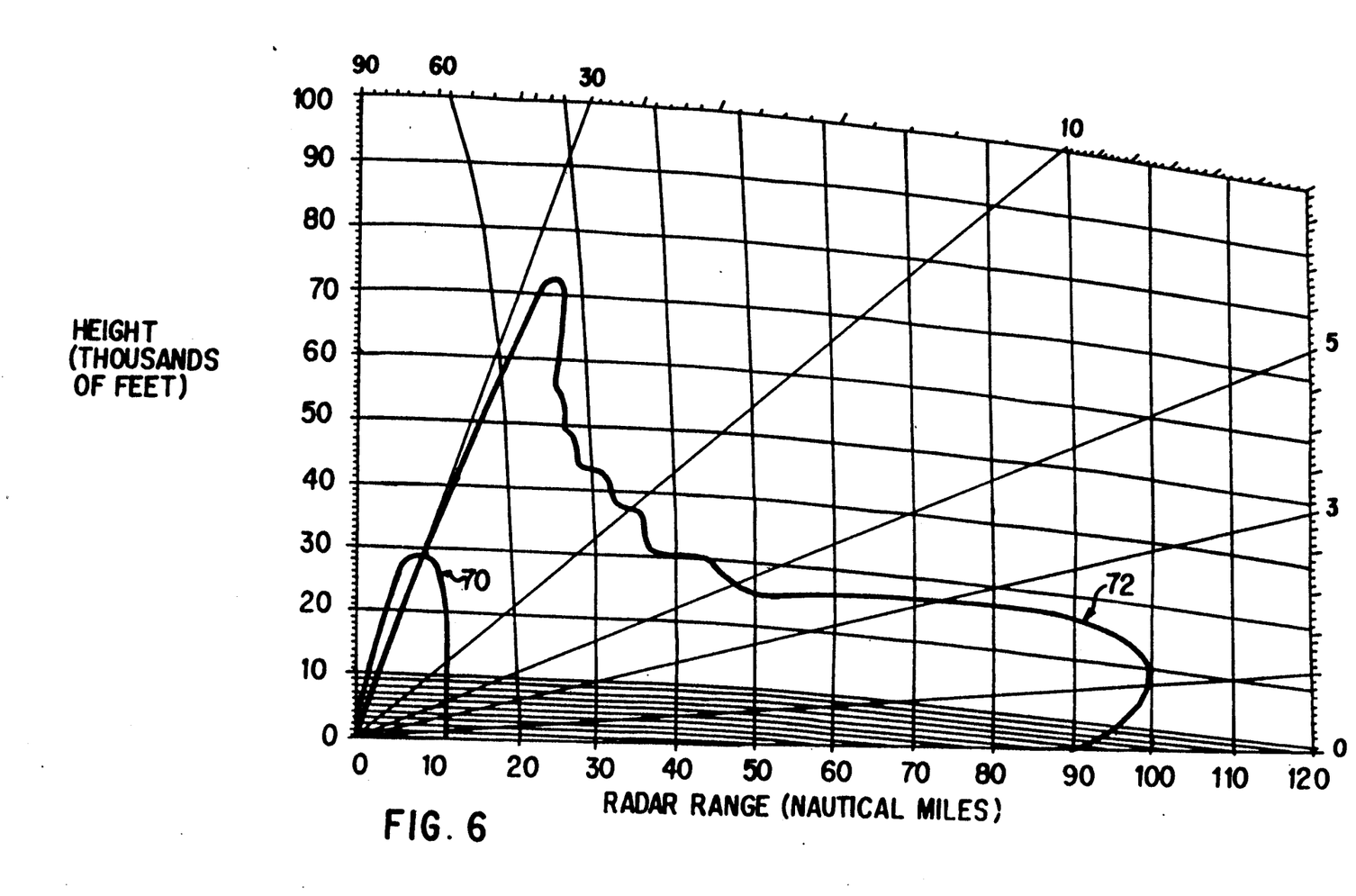
FIG. 6 is a graph illustrating long and short range coverage patterns of an ASR system in accordance with the present invention.

Thus, by varying the phase of the two output signals from differential phase shifter 24, which are amplified and input to transmit beam forming matrix 36, the transmitted beam patterns generated thereby provide the appropriate power distribution to yield complete coverage in the short and long range beam patterns. This is illustrated in FIG. 6 where the short range coverage pattern 70 and the long range coverage pattern 72 provide no "holes" in the coverage.

In accordance with this embodiment, the long range coverage pattern 72 provides similar coverage as the coverage pattern 10 shown in FIG. 1 except that no coverage is required above an elevation angle corresponding to an aircraft at the maximum altitude of interest at the minimum range where echoes from this transmission are received. For example, coverage to 25,000 ft. beyond 10 nmi requires no transmission of energy above 24°.

Also in accordance with this embodiment, transmission of long range pulses occurs only on the low beam. Reception could occur on a high beam, not shown in FIG. 6, between 10 and 20 to 25 nmi, and on the low beam at longer ranges if two receivers are provided.

If the long range beam pattern 68 provides detection of the target to a range of 100 nmi at optimum elevation angle, the short range pattern 66 gain must not be more than 8 dB less at all elevation angles of interest to provide coverage at 10 nmi. A factor of 10 reduction in range corresponds to 40 dB reduction in sensitivity. Short range losses could consist of:

| | | |
|---|---|---|
| Energy in short pulse = | 20 dB | less than long pulse |
| Average Doppler filtering loss = | 4 dB | |
| Short range TX gain = | 8 dB | less than long pulse |
| Short range RX gain = | 8 dB | less than long range |
| Total short range sensitivity in clutter area = | 40 dB | less than long range sensitivity in clutter-free area |

Because the gain of the short range beam is estimated to be only 7 dB below that of the long range beam, and the atmospheric attenuation effect is much smaller at 10 nmi than at 100 nmi, several dB of excess average sensitivity is available at 10 nmi to offset some "dim speed" losses introduced by Doppler filtering.

Although identical beam patterns may be used for transmission and reception, multiple beam patterns may be desirable to provide height data, to lower transmitter power requirements, or to reduce clutter interference with targets at high elevation angles. In such cases, the transmitted beam pattern is altered to maintain the optimum two-way (transmit/receive) coverage patterns.

If multiple simultaneous receiver beams are employed, the switchable transmit pattern provides even greater benefits in reducing power requirements and in increasing signal to noise ratio at high angle targets. High gain on receive at low elevation reduces the energy required at these angles, where clutter is concentrated. The short range transmit beam provides higher gain to aircraft at higher elevation angles than to clutter to compensate differences in gain of the receive beams.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

I claim:

1. A radar apparatus for providing radar coverage, comprising:
    a waveform generator for generating high-energy pulses and low-energy pulses;
    a waveform splitter connected to said waveform generator for splitting each of said high-energy pulses and low-energy pulses into first and second input signals;
    a differential phase shifter connected to said waveform splitter for receiving said first and second input signals;
    a beam forming matrix connected to said differential phase shifter;
    an antenna connected to said beam forming matrix; and
    a controller connected to said differential phase shifter and providing a control signal to said differential phase shifter to shift one of first and second output signals from the differential phase shifter relative to the other to provide a first phase relationship when the waveform generator generates said low-energy pulses and a second phase relationship when said waveform generator generates said high-energy pulses.

2. An apparatus according to claim 1, further comprising first and second amplifiers for amplifying said first and second output signals from said differential phase shifter, respectively.

3. An apparatus according to claim 1, wherein said one of said first and second output signals is shifted by 180° relative to said other of said first and second output signals.

4. An apparatus according to claim 1 wherein said one of said first and second output signal is shifted by 0° relative to said other of said first and second output signals.

5. An apparatus according to claim 1, wherein said antenna radiates a first beam pattern for detecting targets at short ranges and a second beam pattern for detecting targets at long ranges, and wherein said first and second beam patterns provide a radar coverage pattern having no holes.

6. An apparatus according to claim 1, wherein said antenna radiates a first beam pattern for detecting targets at long ranges and a second beam pattern for detecting targets at short ranges, and wherein said short range beam pattern is shaped to provide substantially constant two-way gain between a first elevation angle and a second elevation angle.

7. An apparatus according to claim 6, wherein said first elevation angle is one elevation angle in the range of 20°–40°.

8. A radar apparatus for providing radar coverage, comprising:
    means for transmitting high-energy pulses in a first beam pattern to detect targets at long ranges;
    means for transmitting low-energy pulses in a second beam pattern to detect targets at short ranges;
    means for controlling power in said high-energy and low-energy pulses such that no holes exist in a coverage pattern provided by said first and second beam patterns while minimizing peak power of the radar apparatus.

9. An apparatus according to claim 8, wherein said controlling means includes means for providing a sufficient amount of energy in said short range beam pattern to provide radar coverage for a specified maximum altitude within a range in which echoes from said high-energy pulses are distorted by overlap of the transmitted pulses or strong echoes from clutter.

10. An apparatus according to claim 8, wherein said high-energy pulses have a first frequency, said low-energy pulses have a second frequency, and further comprises means for transmitting said high-energy and low-energy pulses during successive time intervals.

11. A method of providing radar coverage, comprising the steps of:
   transmitting high-energy pulses in a first beam pattern;
   transmitting low-energy pulses in a second beam pattern;
   controlling power in said high-energy and low-energy pulses such that no holes exist in a radar coverage pattern provided by said first and second beam patterns while minimizing peak power to transmit said high-energy and low-energy pulses.

12. A method of generating optimized long and short range coverage patterns in a radar apparatus including a waveform generator, a waveform splitter, a differential phase shifter, a beam forming matrix and an antenna, comprising the steps of:
   generating a low-energy pulse at said waveform generator;
   splitting said low-energy pulse into first and second signals;
   outputting said first and second signals to said differential phase shifter;
   providing a first control signal to said differential phase shifter to shift the phase of said first signal relative to said second signal by a first amount;
   forming a first beam pattern at said beam forming matrix based on the shifted said first and second signals;
   transmitting said first beam pattern to provide an optimized short range coverage pattern;
   generating a high-energy pulse at said waveform generator;
   splitting said high-energy pulse into third and fourth signals;
   outputting said third and fourth signals to said differential phase shifter;
   providing a second control signal to said differential phase shifter to shift the phase of said third signal relative to said fourth signal by a second amount;
   forming a second beam pattern at said beam forming matrix based on the shifted said third and fourth signals; and
   transmitting said second beam pattern to provide an optimized long range coverage pattern.

13. A method according to claim 12, wherein said first and second beam patterns provide a radar coverage pattern having no holes.

14. A method according to claim 12, wherein said first and second control signals are provided at different times.

* * * * *